(12) United States Patent
Chang

(10) Patent No.: US 8,754,871 B2
(45) Date of Patent: Jun. 17, 2014

(54) TOUCH SENSING DEVICE AND SCANNING METHOD THEREOF

(75) Inventor: Ching-Yang Chang, Jhudong Township (TW)

(73) Assignee: TPK Touch Solutions Inc., Taipei (TW)

(*) Notice: Subject to any disclaimer, the term of this patent is extended or adjusted under 35 U.S.C. 154(b) by 212 days.

(21) Appl. No.: 13/205,629

(22) Filed: Aug. 9, 2011

(65) Prior Publication Data

US 2012/0242612 A1 Sep. 27, 2012

(30) Foreign Application Priority Data

Mar. 21, 2011 (TW) .............................. 100109495 A

(51) Int. Cl.
*G06F 3/045* (2006.01)
(52) U.S. Cl.
USPC ........................................ 345/174; 178/18.06
(58) Field of Classification Search
USPC ................................ 345/173–182; 178/18.06
See application file for complete search history.

(56) References Cited

U.S. PATENT DOCUMENTS

2006/0097991 A1* 5/2006 Hotelling et al. ............. 345/173
2006/0279548 A1* 12/2006 Geaghan ....................... 345/173

FOREIGN PATENT DOCUMENTS

| JP | 2009192306 | 8/2009 |
| JP | 2009289235 | 12/2009 |
| KR | 1020080014841 | 2/2008 |
| KR | 1020110003385 | 1/2011 |
| TW | 201011620 | 3/2010 |
| TW | 201011622 | 3/2010 |

* cited by examiner

*Primary Examiner* — Kevin M Nuyen
*Assistant Examiner* — Kenneth B Lee, Jr.
(74) *Attorney, Agent, or Firm* — Gokalp Bayramoglu

(57) ABSTRACT

The present invention provides a capacitive touch sensing device and a scanning method thereof. The present invention divides a scanning procedure of an electrode matrix into two stages. First, it scans broadly for determining whether the potential signal of at least one driving line of the electrode matrix is changed or not. After that, the present invention is only directed to the driving line which the potential signal is changed to scan in detail, to determine whether the potential signal of each coupling node on the driving line is changed or not. Therefore, the present invention can achieve the purpose of improving sensing efficiency of the capacitive touch sensing device.

7 Claims, 4 Drawing Sheets

TOUCH SENSING DEVICE AND SCANNING METHOD THEREOF

This application claims the benefit of Taiwan Application No. 100109495, filed on Mar. 21, 2011.

BACKGROUND OF THE INVENTION

1. Field of the Invention

The present invention relates to a capacitive touch sensing device and scanning method thereof.

2. Description of Related Art

Recently, the touch sensing devices that use capacitive technology have become more popular in different electronic devices. As a result, users now can input information to different devices using multiple touch input.

Please refer to FIG. 1, wherein a circuit block schematic view of a traditional capacitive touch sensing device is shown. As depicted, the capacitive touch sensing device 9 includes an electrode matrix 90, a first multiplexer 91, a driving circuit 92, a second multiplexer 93, an integrator 94, and an analog-to-digital converter 95. The electrode matrix 90 comprises a plurality of driving lines $L_D$ and a plurality of sensing lines $L_S$; each driving line $L_D$ crosses each sensing line $L_S$ to form a coupling node 901. In addition, each coupling node 901 would induce an equivalent capacitor $C_E$ according to rules of electrical specification.

The first multiplexer 91 switches different channels in sequence for transmitting a pulse signal outputted from the driving circuit 92 to each driving line $L_D$ in turn. The second multiplexer 93 switches to receive a charge voltage induced by each sensing line $L_S$ in sequence. In other words, through the operation of the first multiplexer 91 and the second multiplexer 93, the pulse signal would make the equivalent capacitor $C_E$ induced by each coupling node 901 to be charged and discharged in turn. The integrator 94 connects to the second multiplexer 93, and stores the voltage of each equivalent capacitor $C_E$ to an integrating capacitor $C_I$ through an integrating element A1. The analog-to-digital converter 95 connects to the integrator 94, and performs an analog-to digital conversion.

The capacitive touch sensing device 9 would perform an initial process and a touch sensing process in design. In the initial process, the capacitive touch sensing device 9 would store the potential signal of equivalent capacitor $C_E$ induced by each coupling node 901 to be a base potential value individually. After that, in the touch sensing process, the capacitive touch sensing device 9 would compare the present potential signal of equivalent capacitor $C_E$ induced by each coupling node 901, with the correspondingly base potential value stored in the initial process. Thus, if any one of the coupling nodes 901 has been touched, the present potential signal of equivalent capacitor $C_E$ induced by the touched coupling node 901, would be lower than the corresponding base potential value. Therefore, the traditional capacitive touch sensing device 9 decides the coordinate position of the touched coupling node 901 by determining whether the potential signal of each equivalent capacitor $C_E$ is changed or not. However, the traditional technology can only scan and sense one coupling node at a time. If the size of the capacitive touch panel gets larger, or the requirement of the touching accuracy gets higher, the driving lines and the sensing lines would be increased, and the amount of the coupling nodes would also be increased. Accordingly, the capacitive touch sensing device would require more time to scan and sense all coupling nodes, and sensing efficiency would be reduced, and as a result, application requirement could not be met.

SUMMARY OF THE INVENTION

In view of the aforementioned technical issues, an objective of the present invention is to perform the scanning procedure in two stages: designing the hardware circuit and modifying the whole scanning process. First, it performs a course scan to determine whether there is a change in capacitance at least at one driving line of an electrode matrix. Then, the present invention performs a fine scan directed to the driving line, where a change in capacitance was determined during the course scan. The present invention then detects whether the capacitance of each coupling node on the driving line is changed or not. Thus, the present invention can collocate with the recognizing theorem to speed up the determining process of the coordinate position of the actual touch point.

One embodiment of the present invention provides a touch sensing device. The touch sensing device comprises an electrode matrix, a driving circuit, and a sensing circuit. The driving circuit applies signals to the electrode matrix, and the sensing circuit is used to sense signals from the electrode matrix. Wherein, the sensing circuit determines a course touch location, followed by finding at least one touch location.

Another embodiment of the present invention provides a touch sensing device. The capacitive touch sensing device comprises an electrode matrix, a first switching unit, a second switching unit, and a sensing circuit. The electrode matrix comprises a plurality of driving lines and a plurality of sensing lines, and each driving line crosses each sensing line to form a coupling node. The first switching unit connects to the driving lines. The second switching unit comprises a plurality of switches, wherein one end of each switch connects to the corresponding sensing line, and the other end connects to a common point. The sensing circuit connects to the common point. Wherein, in a first scanning stage, the switches are closed in sequence with at least two switches each time, and the sensing circuit determines whether there is a change in capacitance at least at one of the driving lines; in a second scanning stage, the switches are closed in sequence with one switch each time, and the sensing circuit determines whether there is a change in capacitance on at least one of the coupling nodes of the driving line where the change in capacitance was determined.

Another embodiment of the present invention provides a method for scanning a touch sensing device. The touch sensing device comprises an electrode matrix, and the method comprising the steps of determining whether there is a change in capacitance at least at one driving line of the electrode matrix, and then determining whether there is a change in capacitance at least on one coupling node of the driving line where the change in capacitance was determined.

As to the effect provided by the present invention, the capacitive touch sensing device could shorten the scanning and sensing time to effectively improve the efficiency by simply modifying the hardware circuit, which would not increase the cost substantially.

The above description, the following description, as well as the attached drawings are all provided to further illustrate techniques and means that the present invention takes for achieving the prescribed objectives and effects.

DETAILED DESCRIPTION OF THE PREFERRED EMBODIMENTS

The present invention provides a device that performs a scanning procedure in two stages. First, it performs a course scan of the touch panel for determining whether there is a change in capacitance at least at one row (column) of an electrode matrix. After this initial scan, the present invention then performs a fine scan directed to the row (column) where a change in capacitance was detected during the course scan. This way, the present invention detects whether the capacitance of each coupling node on the row (column) is changed or not. Therefore, the present invention can provide the related potential information to decide the coordinate position of the actual touch point.

Figure 1:
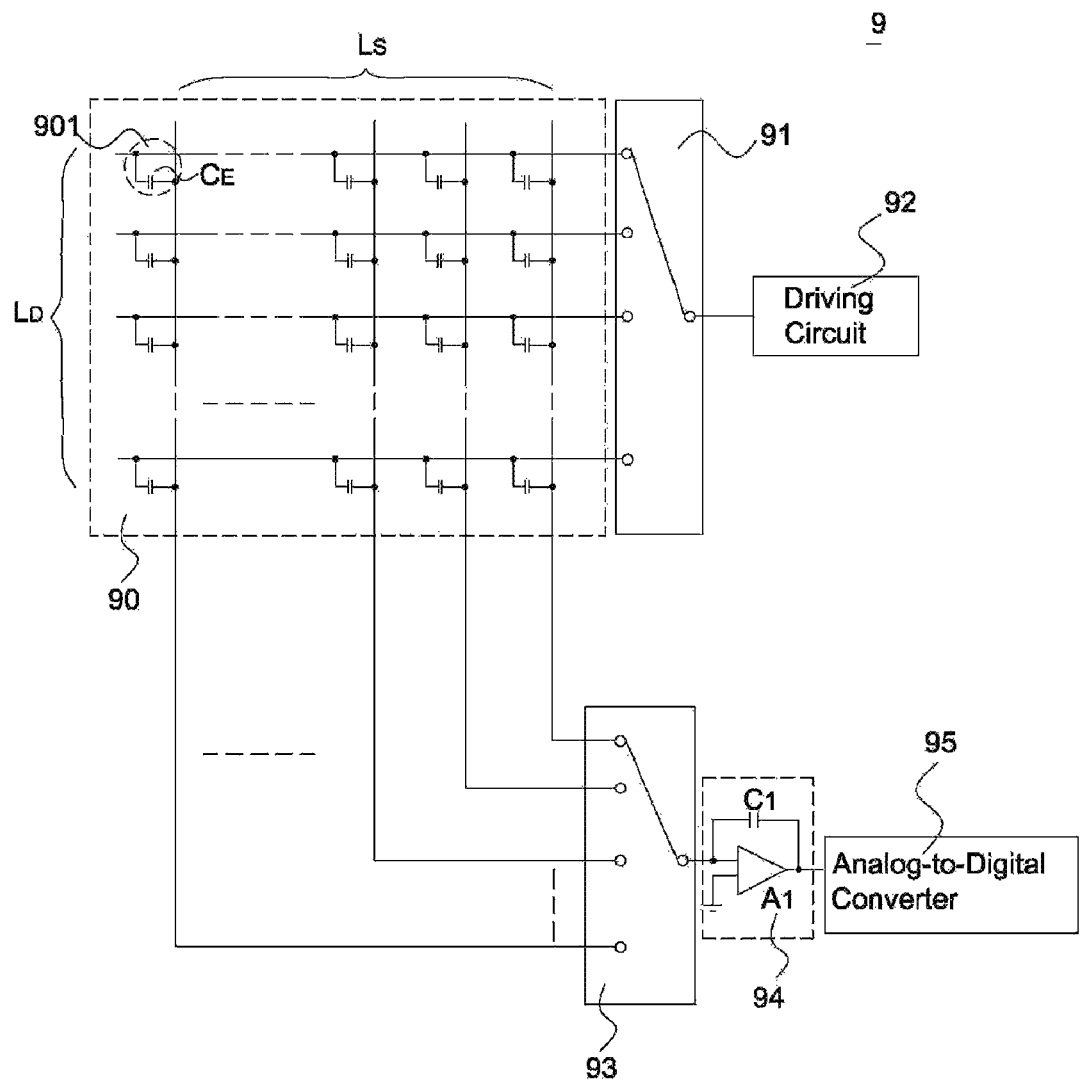
FIG. 1 is a circuit block schematic view of a traditional capacitive touch sensing device.
Figure 2:
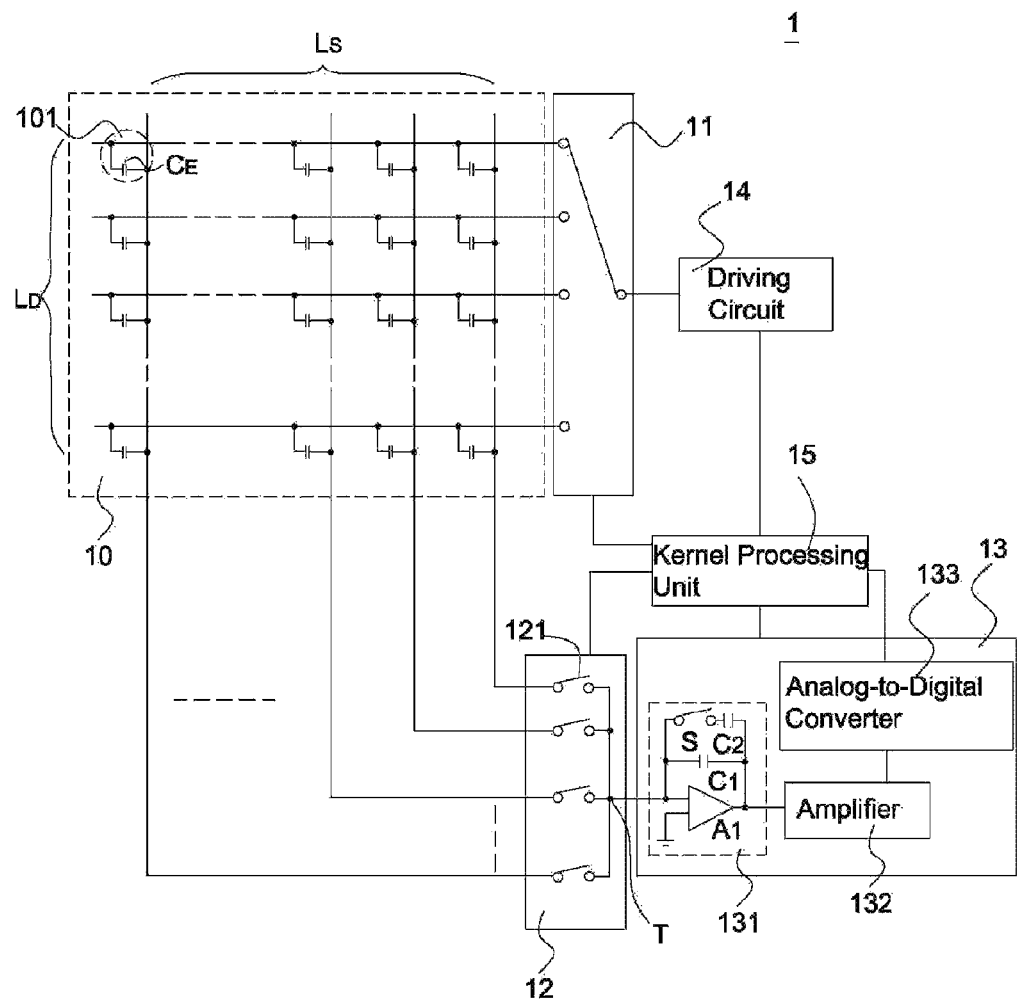
FIG. 2 is a circuit block schematic view of an embodiment of a capacitive touch sensing device according to the present invention.

Please refer to FIG. 2, wherein a circuit block schematic view of an embodiment of a capacitive touch sensing device according to the present invention is shown. As depicted, the capacitive touch sensing device 1 comprises an electrode matrix 10, a first switching unit 11, a second switching unit 12, a sensing circuit 13, a driving circuit 14, and a kernel processing unit 15. The electrode matrix 10 comprises a plurality of driving lines $L_D$ and a plurality of sensing lines $L_S$, and each driving line $L_D$ crosses each sensing line $L_S$ to form a coupling node 101. In addition, each coupling node 101 can induce an equivalent capacitor $C_E$ according to the rules of electrical specification.

Moreover, the skilled in the art should understand that the driving lines $L_D$ and the sensing lines $L_S$ of the electrode matrix 10 may be, for example, designed as two separate transparent conducting layers such as Indium Tin Oxide (ITO). The two transparent conducting layers are respectively disposed on both sides of a glass substrate or a transparent substrate made of any suitable material, and then respectively form the driving lines $L_D$ and the sensing lines $L_S$ based on a selected forming process of electrode pattern. Accordingly, the above-mentioned structure would become a capacitive touch panel. However, the type of electrode pattern of the electrode matrix 10 and the structure of the capacitive touch panel are not limited by the present invention, and thus will not be further described herein.

The first switching unit 11 may be, for example, designed as a one-to-many demultiplexer. The input of the first switching unit 11 is connected to the driving circuit 14, and the outputs of the first switching unit 11 are correspondingly connected to the driving lines $L_D$. When the first switching unit 11 receives a pulse signal generated from the driving circuit 14, the first switching unit 11 could transmit the pulse signal to the driving lines $L_D$ in sequence according to a predetermined cycle.

The second switching unit 12 comprises a plurality of switches 121. The input of each switch 121 is connected to the corresponding sensing line $L_S$, and the output of each switch 121 is connected to the common point T. Hence, the second switching unit 12 can be controlled to contact several switches 121 at the same time except that the second switching unit 12 could be controlled to only contact one of the switches 121 at a time to form the structure of many-to-one multiplexer.

The sensing circuit 13 is connected to the common point T. When at least one switch 121 of the second switching unit 12 is closed, the sensing circuit 13 senses the corresponding sensing line $L_S$ and outputs a signal. More particularly, the sensing circuit 13 further comprises an integrator 131, an amplifier 132, and an analog-to-digital converter 133. The integrator 131 is connected to the common point T for receiving a charge voltage induced by the sensing line $L_S$, which is connected to the corresponding closed switch 121, and integrates the input signal. The amplifier 132 is connected to the output of the integrator 131 for amplifying a waveform signal. The analog-to-digital converter 133 is connected to the output of the amplifier 132 for converting the amplified waveform signal from analog to digital. Incidentally, the signal outputted from the sensing circuit 13 could be further stored in a memory unit (not shown) of the capacitive touch sensing device 1.

The kernel processing unit 15 is used for controlling the operations of the first switching unit 11, the second switching unit 12, the sensing circuit 13, and the driving circuit 14, and further performs a comparison operation according to the signal. In addition, the kernel processing unit 15 of the present embodiment is designed to control a scanning process of the capacitive touch sensing device 1 for operating in a first scanning stage (course scan) or a second scanning stage (detailed scan).

In fact, when the kernel processing unit 15 controls to operate in the first scanning stage, if the first switching unit 11 switches to transmit the pulse signal to one of the driving lines $L_D$, the second switching unit 12 closes the switches 121 in sequence by at least two switches at a time. Accordingly, for each time, the sensing circuit 13 sums the charge voltages induced by the sensing lines $L_S$, which are respectively connected to the at least two corresponding closed switches 121, and then outputs one potential signal. Therefore, in terms of the present driving line $L_D$, which receives the pulse signal from the first switching unit 11, after the second switching unit 12 closes all switches 121 in sequence, the sensing circuit 13 could generate at least one potential signal corresponding to the present driving line $L_D$.

For example, assuming that there are five driving lines $L_D$ and ten sensing lines $L_S$, and the second switching unit 12 has ten switches 121 corresponding to the amount of the sensing lines $L_S$. Thus, if the second switching unit 12 closes five switches 121 each time, then the second switching unit 12 would close a total of ten switches 121 in twice as much time. In other words, each driving line $L_D$ would be corresponding to two potential signals. Surely, if the second switching unit 12 closes ten switches 121 each time, the second switching unit 12 would close a total of ten switches 121 at one time, and each driving line $L_D$ would be corresponded with only one potential signal.

As the above-mentioned operation in the first scanning stage, when the first scanning stage is completed, the sensing circuit 13 could generate at least one potential signal corresponding to each driving line $L_D$, and then stores the potential signal into the memory unit. Thus it can be seen that the at least one potential signal recorded by the present invention in the first scanning stage belongs to a line potential signal of the driving lines $L_D$, and is used for determining which courses of the driving lines $L_D$ are touched. That is to say, it is used to determine the course touch locations in the first scanning stage.

Next, when the kernel processing unit 15 controls the operation of the second scanning stage, if the first switching unit 11 switches to transmit the pulse signal to an indicated driving line $L_D$ one at a time, the second switching unit 12 closes the switches 121 in sequence by one switch at a time. Therefore, in terms of the presently indicated driving line $L_D$, which receives the pulse signal from the first switching unit 11, after the second switching unit 12 closes all switches 121 in sequence, the sensing circuit 13 can respectively generate one potential signal corresponding to each coupling node 101 on the present indicated driving line $L_D$. Thus, each potential signal recorded by the present invention in the second scanning stage belongs to a point potential signal, and is used for finding which coupling nodes 101 of the present indicated driving line $L_D$ are touched. That is to say it is used to find the exact touch locations among the course touch locations in the second scanning stage.

The system operates such that device 1 detects a capacitive touch location on a touch panel by comparing the difference between the potential signals before and after. In other words, the capacitive touch sensing device 1 operates enter an initial process by first recording a base potential values, and then by scanning and sensing and calculating touch point based on the comparison method discussed earlier. The process controlled by the kernel processing unit 15 is always performed in two stages, the first scanning stage and then the second scanning stage.

Thus, the above-mentioned indicated driving line $L_D$ in the second scanning stage would be defined by different definitions in different processes.

1. During the initial process, it is necessary to record potential signals at coupling nodes 101 for all driving lines $L_D$. So, the indicated driving line $L_D$ represents any one of all driving lines $L_D$, and all driving lines $L_D$ would respectively receive the pulse signal in sequence.

2. During the sensing process, the kernel processing unit 15 compares the line potential signals recorded in the first scanning stage of the sensing process, with the line potential signal recorded in the first scanning stage of the initial process. This comparison yields the identification of the driving line $L_D$. Thus, the indicated driving line $L_D$ represents the driving line $L_D$ that has different line potential signals. In other words, the indicated driving line $L_D$ is supposed to be a touched driving line $L_D$.

Finally, to describe the structure of the integrator 131 of the present embodiment in detail, the integrator 131 comprises an integrating element A1, a first integrating capacitor C1, a second integrating capacitor C2, and a switching element S. The first integrating capacitor C1 is disposed on the feedback path of the integrating element A1. The first integrating capacitor C1 is designed as a main capacitor for storing the charge voltage. The second integrating capacitor C2 is connected to the first integrating capacitor C1 in parallel. The second integrating capacitor C2 is designed as an extended capacitor for storing the charge voltage. The switching element S is connected to the second integrating capacitor C2 in series for controlling the operation of the second integrating capacitor C2.

Accordingly, in the first scanning stage, because the second switching unit 12 closes at least two switches at a time, the integrating element A1 needs a larger capacitor for storing the sum of the charge voltages respectively induced by the at least two sensing lines $L_S$. The switching element S is closed for operating the second integrating capacitor C2 in the first scanning stage. In the second scanning stage, because the second switching unit 12 closes one switch at a time, the storing requirement of charge voltage of the integrating element A1 is less. The switching element S is opened for terminating the second integrating capacitor C2 in the second scanning stage.

In practical design, if it is not necessary to consider that the one large capacitor would occupy layout space and extend discharge time, the integrator 131 could only select the first integrating capacitor C1 with large capacitance. In addition, the specifications of the first integrating capacitor C1 and the second integrating capacitor C2 are decided by the number of switches closed at a time in the first scanning stage, which is not limited herein.

For more supplementary explanations, the above-mentioned first switching unit 11, the second switching unit 12, the sensing circuit 13, the driving circuit 14, and the kernel processing unit 15 could be integrated into a single chip system in design. In addition, a person skilled in the art should understand that further peripheral circuits such as a filter (not shown) can be added into the sensing circuit 13 to improve sensitivity and accuracy in sensing, which is also not limited herein.

Figure 3:
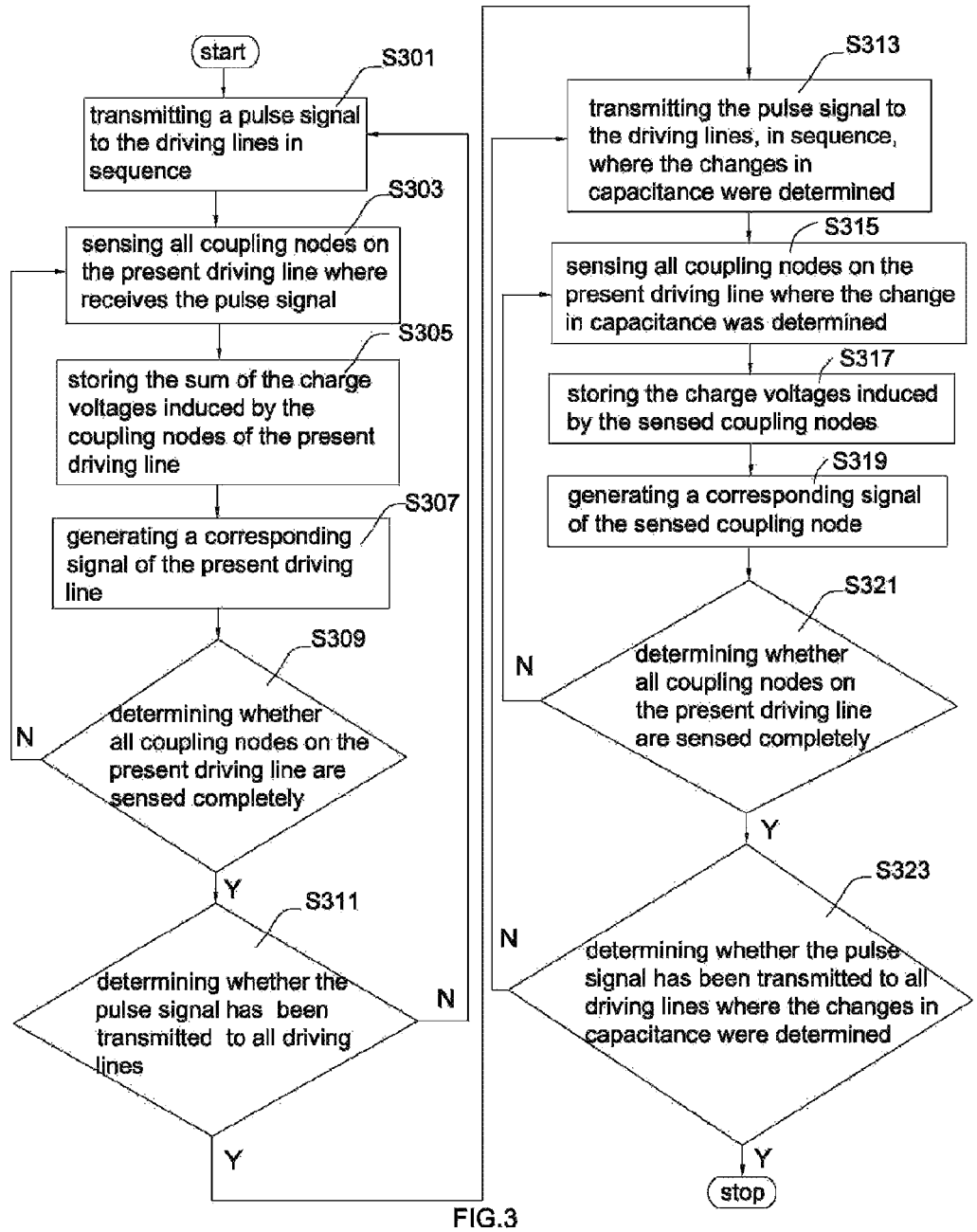
FIG. 3 a flowchart of an embodiment of a method for scanning the capacitive touch sensing device according to the present invention.

Referring to FIG. 3, a flowchart of an embodiment of a method for scanning the capacitive touch sensing device according to the present invention is shown. As shown in FIG. 3, the method of the present embodiment comprises the first step where the capacitive touch sensing device 1 is operated in a first scanning stage for transmitting a pulse signal to the driving lines $L_D$ in sequence (S301). When one of the driving lines $L_D$ has received the pulse signal, it senses all coupling nodes 101 on the present driving line $L_D$, where it receives the pulse signal by sensing at least two coupling nodes each time in sequence (S303). After the previous step (S303) is completed, the sum of the charge voltages, respectively induced by the at least two coupling nodes 101, is stored (S305), and then a corresponding signal of the present driving line $L_D$ where receives the pulse signal is generated (S307).

Next, it is determined whether all coupling nodes 101 on the present driving line $L_D$ are sensed completely (S309). If the determination result of step (S309) is false, it repeats to perform the step (S303) to the step (S309) until the determination result of step (S309) is true. If the determination result of step (S309) is true, it means that the present driving line $L_D$ has been scanned completely in the first scanning stage. Moreover, it also has generated at least one corresponding signal of the present driving line $L_D$.

Following that, it is further determined whether the pulse signal has been transmitted to all driving lines $L_D$ (S311). If the determination result of step (S311) is false, it repeats to perform the step (S303) and the following steps thereof until the determination result of step (S311) is true. If the determination result of step (S311) is true, it means that all driving lines $L_D$ have been sensed completely in the first scanning stage. Hereby, it can determine whether there is a change in capacitance at least at one of the driving lines $L_D$ according to the corresponding signals of all driving lines $L_D$.

After the step (S311), the capacitive touch sensing device 1 is operated in a second scanning stage to transmit the pulse signal, in sequence, to the driving lines $L_D$, where the changes in capacitance were determined (S313). When one of the driving lines $L_D$ has received the pulse signal, it starts to sense all coupling nodes 101 on the present driving line $L_D$, where the change in capacitance was determined, by sensing one coupling node each time (S315). In addition, if it has finished sensing one coupling node 101, it could store the charge voltage induced by the sensed coupling node 101 (S317), and generate a corresponding signal of the sensed coupling node 101 (S319).

Next, it is determined whether all coupling nodes 101 on the present driving line $L_D$ are sensed completely (S321). If the determination result of step (S321) is false, it repeats to perform the step (S315) to the step (S321) until the determination result of step (S321) is true. If the determination result of step (S321) is true, it means that the present driving line $L_D$ has been scanned completely in the second scanning stage, and it also has generated the corresponding signal of each coupling node 101 of the present driving line $L_D$.

Additionally, after the determination result of step (S321) is determined to be true, it is further determined whether the pulse signal has been transmitted to all driving lines $L_D$ where the changes in capacitance were determined (S323). If the determination result of step (S323) is false, it repeats to perform the step (S313) and the following steps thereof until the determination step of step (S323) is true. If the determination result of step (S323) is true, it means that all driving lines $L_D$, where the changes in capacitance were determined, have been scanned completely in the second scanning stage. Hereby, it can determine whether there is a change in capacitance at least on one of the coupling nodes of the driving lines, where the changes in capacitance were determined, according to the corresponding signals of the coupling nodes 101.

The scanning method of the above embodiment is for explaining the steps of performing the scanning procedure in one cycle. The capacitive touch sensing device 1 would perform the scanning method of the present embodiment continuously in operation. In addition, the capacitive touch sensing device 1 would collocate with the recognizing theorem to decide the coordinate position of the actual touch point.

Figure 4:
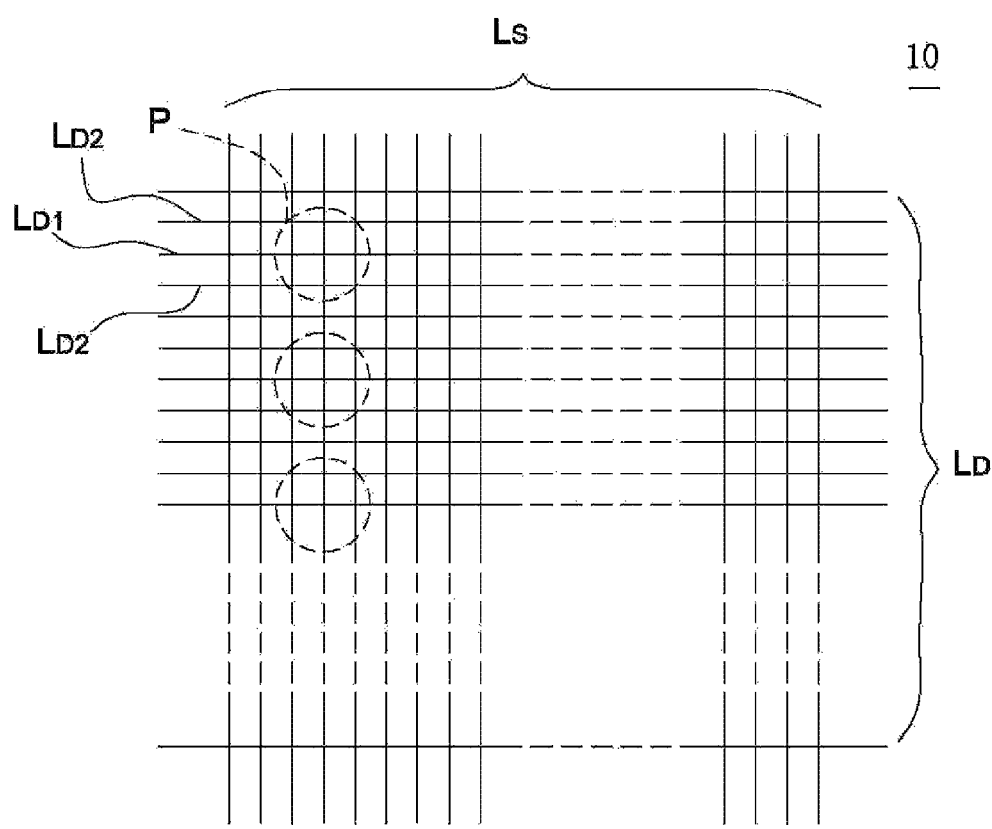
FIG. 4 is an embodiment schematic view of a cover area of the touch points on an electrode matrix according to the present invention.

Finally, the following description is to cite an instance for illustrating that the scanning speed of the present invention could be improved. Referring to FIG. 4, an embodiment schematic view of a cover area of the touch points on an electrode matrix according to the present invention is shown. The electrode matrix 10 of the present embodiment has 128 driving lines $L_D$ and 64 sensing lines $L_S$ to form a 128*64 array. In the present embodiment, the crossing part crossed by each driving line $L_D$ and each sensing line $L_S$ is like the structure of the coupling node 101, illustrated in FIG. 2, and is not drawn in detail herein.

It is supposed that the time for sensing each coupling node 101 (equivalent capacitor) of the electrode matrix 10 is t, and there are ten touch points P on different positions without overlapping in the end of driving line $L_D$ at the same time. The influenced area of each touch point P on the electrode matrix 10 is 3*3 (total nine coupling nodes 101). In addition, when the capacitive touch sensing device 1 is operated in the first scanning stage, and any one of the driving lines $L_D$ has received the pulse signal, the second switching unit 12 closes 64 switches each time. So, the capacitive touch sensing device 1 would scan the present driving line $L_D$ by sensing 64 coupling nodes at a time.

Thus, the following are the calculation times needed by the present embodiment.

In the first scanning stage, due to the fact that it scans each driving line $L_D$ by sensing 64 coupling nodes at the same time for once, the time needed for scanning a total of 128 driving lines $L_D$ is:

$$128*t=128t \qquad \text{Time (1)}$$

Because it is supposed that in the present embodiment ten touch points P are formed at the same time, the influence area of each touch point P is 3*3. Thus, there are 30 driving lines $L_D$ that would be influenced, which is caused by the potential signal of any one of the 30 driving lines $L_D$ with a difference before and after touching. However, in practical design, it only sets a major influence driving line $L_{D1}$, covered by each touch point P, to be the indicated driving line. Wherein, the major influence driving line $L_{D1}$ represents the driving line $L_D$, which produces the greatest influence. Usually, the middle one among the three driving lines $L_D$, covered by each touch point P, is the major influence driving line $L_{D1}$. Therefore, after the first scanning stage is finished, there are 10 major influence driving lines $L_{D1}$ that would be further scanned in the second scanning stage.

In the second scanning stage, due to the fact that it scans each major influence driving line $L_{D1}$ by sensing one coupling node at one time, it needs to perform the sense with 64 times for each major influence driving line $L_{D1}$. The time needed to scan all ten major influence driving lines $L_{D1}$ is:

$$10*64*t=640t \qquad \text{Time (2)}$$

After the second scanning stage is finished, it can definitely be determined which three coupling nodes 101 on each major influence driving line $L_{D1}$ are influenced, which is caused by the potential signal of any one of the three coupling nodes 101 with a difference before and after touching.

In addition, due to the fact that each touch point P has other two minor influence driving lines $L_{D2}$, except the major influence driving line $L_{D1}$, to improve the accuracy in recognizing, it is directed to the remaining 20 minor influence driving lines $L_{D2}$ to further perform a partial scan. It respectively scans the two minor influence driving lines $L_{D2}$ of each touch point P corresponding to the three influenced coupling nodes 101 of the major influence driving line $L_{D1}$ of each touch point P. The time needed of the partial scan is:

$$20*3*t=60t \qquad \text{Time (3)}$$

Thereupon, to sum up the above Times (1), (2), and (3), the time needed of the present embodiment to perform the scanning procedure in one cycle is:

$$128t+640t+60t=828t \qquad \text{Time (4)}$$

On the contrary, if it scans the whole 128*64 electrode matrix 10 by sensing one coupling node at a time to decide the coordinate position of all ten touch points P, the time needed is:

$$128*64*t=8192t \qquad \text{Time (5)}$$

By comparing Time (4) with Time (5), it is shown the present invention can reduce the scanning time of the capacitive touch sensing device 1.

In summary, the capacitive touch sensing device of the present invention could reduce the scanning and sensing time to effectively improve the efficiency by simply modifying the hardware circuit and collocating the controlling of the scanning procedure. In addition, the cost of the present invention would not be increased substantially.

While certain embodiments have been shown and described, various modifications and substitutions may be made thereto without departing from the spirit and scope of the invention. Accordingly, it is to be understood that the present invention has been described in the way of illustration but not limitations.

What is claimed is:

1. A touch sensing device, comprising:
    an electrode matrix, comprising a plurality of driving lines and a plurality of sensing lines, wherein each driving line crosses each sensing line to form a coupling node;
    a first switching unit configured to connect the driving lines;
    a second switching unit, comprising a plurality of switches, wherein one end of each switch connects to the corresponding sensing line, and the other end of each switch connects to a common point; and a sensing circuit configured to connect to the common point;

wherein, in a first scanning stage, the switches are closed in sequence by at least two switches each time, and the sensing circuit determines whether there is a change in capacitance at least at one of the driving lines; in a second scanning stage, the switches are closed in sequence by one switch each time, and the sensing circuit determines whether there is a change in capacitance at least on one of the coupling nodes of the driving line where the change in capacitance was determined.

2. The touch sensing device according to claim 1, wherein the sensing circuit generates at least one corresponding signal of each driving line after completing the first scanning stage, and generates one corresponding signal of each coupling node of the driving line where the change in capacitance was determined after completing the second scanning stage.

3. The touch sensing device according to claim 1, wherein the sensing circuit comprises: an integrator configured to connect to the common point for receiving a charge voltage induced by the sensing line connected to the corresponding closed switch.

4. The touch sensing device according to claim 3, wherein the integrator further comprises:

an integrating element;
a first integrating capacitor disposed on the feedback path of the integrating element, and the first integrating capacitor is a main capacitor for storing the charge voltage;
a second integrating capacitor configured to connect to the first integrating capacitor in parallel, and the second integrating capacitor is an extended capacitor for storing the charge voltage; and
a switching element: configured to connect to the second integrating capacitor in series for controlling the operation of the second integrating capacitor.

5. The touch sensing device according to claim 4, wherein the switching element closes to operate the second integrating capacitor in the first scanning stage, and opens to terminate the second integrating capacitor in the second scanning stage.

6. The touch sensing device according to claim 3, wherein the sensing circuit further comprises:

an amplifier configured to connect to the output of the integrator for amplifying a waveform signal outputted from the integrator; and
an analog-to-digital converter configured to connect to the output of the amplifier for converting the amplified waveform signal from analog to digital.

7. The touch sensing device according to claim 2, further comprising:

a driving circuit configured to connect to the first switching unit; and
a kernel processing unit configured to control the driving circuit, the first switching unit, the second switching unit, and the sensing circuit, to operate in the first scanning stage and the second scanning stage, and the kernel processing unit performing a comparison operation according to the signal.

* * * * *